US010035198B2

(12) United States Patent
Dudzinsky et al.

(10) Patent No.: US 10,035,198 B2
(45) Date of Patent: Jul. 31, 2018

(54) DOUBLE-SIDED, INDEXABLE CUTTING INSERT WITH RAMPING CAPABILITY AND CUTTING TOOL THEREFOR

(75) Inventors: Ronald Louis Dudzinsky, Derry, PA (US); Konrad Spitzenberger, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 795 days.

(21) Appl. No.: 13/296,302

(22) Filed: Nov. 15, 2011

(65) Prior Publication Data

US 2013/0121775 A1    May 16, 2013

(51) Int. Cl.
*B23C 5/20*    (2006.01)
*B23C 5/22*    (2006.01)

(52) U.S. Cl.
CPC .... *B23C 5/2221* (2013.01); *B23C 2200/0494* (2013.01); *B23C 2200/085* (2013.01); *B23C 2200/125* (2013.01); *B23C 2200/286* (2013.01); *B23C 2210/168* (2013.01); *Y10T 407/1924* (2015.01); *Y10T 407/23* (2015.01); *Y10T 407/235* (2015.01)

(58) Field of Classification Search
CPC .......... B23C 5/02; B23C 5/109; B23C 5/207; B23C 5/2221; B23C 2200/0416; B23C 2200/126; B23C 2200/125; B23C 2200/205
USPC ................. 407/113, 34, 42, 48, 61
See application file for complete search history.

(56) References Cited

U.S. PATENT DOCUMENTS

| | | | |
|---|---|---|---|
| 5,078,550 A * | 1/1992 | Satran et al. ................. | 407/34 |
| 5,207,538 A | 5/1993 | Satran | |
| 5,466,097 A | 11/1995 | Wallstrom | |
| 6,196,770 B1 | 3/2001 | Astrom et al. | |
| 6,725,758 B2 | 4/2004 | MacLennan | |
| 6,872,034 B2 | 3/2005 | Satran et al. | |
| 7,014,396 B2 | 3/2006 | Satran et al. | |
| 7,104,735 B2 * | 9/2006 | Johnson et al. ............... | 407/42 |
| 7,104,736 B2 | 9/2006 | Satran et al. | |
| 7,241,082 B2 | 7/2007 | Smilovici et al. | |
| 7,246,973 B2 | 7/2007 | Johnson et al. | |
| D588,616 S * | 3/2009 | Tanaka ......................... | D15/139 |

(Continued)

FOREIGN PATENT DOCUMENTS

| | | |
|---|---|---|
| CN | 1116835 A | 2/1996 |
| CN | 1059488 C | 12/2000 |

(Continued)

OTHER PUBLICATIONS

Office Action dated Nov. 21, 2014.
CN 103100747A, Dec. 29, 2015 First office action CN 103100747A.

*Primary Examiner* — Alan Snyder
(74) *Attorney, Agent, or Firm* — Matthew S. Bedsole (57) ABSTRACT

A double-sided, indexable cutting insert for a milling cutter includes a first surface, a second surface, and side surfaces. Major cutting edges are defined at an intersection between the first and second surfaces and side surfaces. Minor cutting edges and ramping cutting edges are defined at the intersection between the first and second surfaces and side surfaces. The cutting insert is mounted in a milling cutter having a bottom seating surface formed at an angle with respect to a central, rotational axis of the milling cutter, which provides superior performance for both milling and ramping cutting operations.

11 Claims, 7 Drawing Sheets

(56) References Cited

U.S. PATENT DOCUMENTS

| | | | |
|---|---|---|---|
| 7,713,006 B2 | 5/2010 | MacLennan | |
| D637,214 S * | 5/2011 | Saito | D15/139 |
| D638,041 S * | 5/2011 | Saito | D15/139 |
| 8,043,031 B2 | 10/2011 | Sung et al. | |
| D748,703 S * | 2/2016 | Nam | D15/139 |
| D755,267 S * | 5/2016 | Lee | D15/139 |
| D772,318 S * | 11/2016 | Nam | D15/139 |
| D772,319 S * | 11/2016 | Nam | D15/139 |
| D772,963 S * | 11/2016 | Nam | D15/139 |
| D777,230 S * | 1/2017 | Fang | D15/139 |
| D778,330 S * | 2/2017 | Fang | D15/139 |
| 2005/0169716 A1* | 8/2005 | Smilovici et al. | 407/113 |
| 2005/0214081 A1 | 9/2005 | Satran | |
| 2007/0031201 A1* | 2/2007 | Maeda | 407/34 |
| 2008/0232912 A1 | 9/2008 | Bhagath | |
| 2010/0054872 A1 | 3/2010 | Sung et al. | |
| 2010/0303563 A1 | 12/2010 | Fang et al. | |
| 2011/0129309 A1 | 6/2011 | Kovac | |
| 2011/0170963 A1 | 7/2011 | Smilovici | |
| 2012/0009029 A1 | 1/2012 | Saji | |
| 2012/0170986 A1 | 7/2012 | Nam | |
| 2013/0115022 A1 | 5/2013 | Ishi | |
| 2013/0336735 A1 | 12/2013 | Nam | |
| 2014/0298967 A1 | 10/2014 | Ishi | |
| 2015/0117969 A1 | 4/2015 | Brunetto | |
| 2015/0139745 A1 | 5/2015 | Lee | |
| 2015/0336187 A1 | 11/2015 | Choi | |
| 2016/0023285 A1 | 1/2016 | Saji | |
| 2017/0014919 A1 | 1/2017 | Kister | |
| 2017/0157685 A1 | 6/2017 | Mao | |
| 2017/0197259 A1 | 7/2017 | Kumoi | |

FOREIGN PATENT DOCUMENTS

| | | |
|---|---|---|
| CN | 1087566 C | 7/2002 |
| CN | 1913998 A | 2/2007 |
| CN | 101594960 A | 12/2009 |
| CN | 101678478 A | 3/2010 |
| CN | 101594960 B | 5/2011 |
| CN | 101090792 B | 3/2012 |
| CN | 101745675 B | 11/2014 |
| CN | 103100747 | 10/2017 |
| DE | 69111688 T2 | 2/1996 |
| DE | 102011088318 A1 | 7/2012 |
| EP | 699495 A1 | 3/1996 |
| EP | 0699495 B1 | 7/2001 |
| EP | 1960141 B1 | 2/2011 |
| WO | 03053618 A1 | 7/2003 |
| WO | WO03053618 | 7/2003 |
| WO | 2011/086544 A1 | 7/2011 |
| WO | 2011086544 A1 | 7/2011 |

* cited by examiner

DOUBLE-SIDED, INDEXABLE CUTTING INSERT WITH RAMPING CAPABILITY AND CUTTING TOOL THEREFOR

BACKGROUND OF THE INVENTION

The invention relates to a cutting insert for a cutting operation, and more particularly, to a double-sided, indexable cutting insert that is capable of performing milling and ramping operations.

Milling cutters for performing machining operations on metallic work pieces are well known in the prior art. Such cutters typically comprise a cylindrical or disc-shaped body which is detachably connectable to a rotating drive shaft. Cutting inserts are mounted around the outer periphery of the cutter body for producing a series of metal-shaving cuts on a work piece.

Conventional indexable milling inserts that advertise ramping capability can only perform ramping operations at a very slight or shallow angle. As a result, conventional indexable milling inserts that advertise ramping capability perform ramping operations very poorly.

Accordingly, there is a need for an improved cutting insert that can adequately perform both milling and ramping cutting operations.

SUMMARY OF THE INVENTION

The inventors of the invention has solved the problem of a cutting insert that is not able to adequately perform both milling and ramping cutting operations by providing a milling cutter having a bottom seating surface formed at a positive angle with respect to a central rotational axis of the milling cutter, and providing a clearance between the seating surface and the cutting edges of the cutting insert.

In one aspect, a double-sided, indexable cutting insert for a milling cutter comprises a first surface, a second surface opposite the first surface, a first pair of opposing side surfaces and a second pair of opposing side surfaces, the first surface including a seating surface defining a plane. A major cutting edge is defined at an intersection between the first and second surfaces and the first pair of opposing side surfaces. A corner radius connects the first pair of opposing side surfaces to the second pair of opposing side surfaces. A tangency point delineates the corner radius from the first pair of opposing side surfaces. A minor cutting edge is defined at an intersection between the first and second surfaces and a first planar facet surface of the second pair of opposing side surfaces. A ramping cutting edge is defined at the intersection between the first and second surfaces and a second planar facet surface of the second pair of opposing side surfaces, the second planar facet surface being radially inward with respect to the first planar facet surface, wherein the cutting insert is capable of performing both milling and ramping cutting operations.

In another aspect, a milling cutter comprises a shank and an upper portion having an insert pocket. The insert pocket include a bottom seating surface, a radial seating surface and an axial seating surface. A cutting insert is mounted in the insert pocket. The cutting insert includes a first surface, a second surface opposite the first surface, a first pair of opposing side surfaces defining a planar seating surface, and a second pair of opposing side surfaces including a planar seating surface. The cutting insert further includes a major cutting edge defined at an intersection between the first and second surfaces and the first pair of opposing side surfaces, a minor cutting edge defined at an intersection between the first and second surfaces and a first planar facet surface of the second pair of opposing side surfaces. A ramping cutting edge is defined at the intersection between the first and second surfaces and a second planar facet surface of the second pair of opposing side surfaces, the second planar facet surface being radially inward with respect to the first planar facet surface, wherein the bottom seating surface of the insert pocket is formed at a positive angle with respect to a central, rotational axis of the milling cutter, thereby enabling the cutting insert to perform both milling and ramping cutting operations.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring to the drawings, wherein like reference characters represent like elements, there is shown in FIGS. 1-5 a cutting insert 10 that includes generally, a first surface 12, a second surface 14 opposite the first surface 12, and side surfaces 16, 18, 20, 22. The side surfaces 16, 18, 20, 22 serve as seating surfaces when the cutting insert 10 is mounted in a cutting tool, such as a milling cutter that is described below. It is noted that the cutting insert 10 is a double-side insert in which the first surface 12 is substantially identical to the second surface 14. Therefore, only the first surface 12 may be described below for brevity. As is known in the art, the first surface 12 may become the top surface and the second surface may become the bottom surface when mounted within a tool holder (not shown), and vice versa. The cutting insert 10 includes a central, longitudinal axis 11 (Z-axis), a second axis 13 (Y-axis) perpendicular to the central, longitudinal axis 11, and a third axis 15 (X-axis) perpendicular to bot the central, longitudinal axis 11 and the second axis 13.

The cutting insert 10 includes a first major cutting edge 24 at the intersection between the side surface 16 and the first surface 12, and a second major cutting edge 26 at the intersection between the side surface 18 and the first surface 12. Similarly, the cutting insert 10 includes a third major cutting edge 28 at the intersection between the side surface 16 and the second surface 14, and a fourth major cutting edge 30 at the intersection between the side surface 18 and the second surface 14. Thus, the double-sided cutting insert 10 includes a total of four major cutting edges 24, 26, 28 and 30.

A corner radius 32, 34 connects the side surfaces 16, 18 and the side surfaces 20, 22. A tangency point 36 delineates the transition between the substantially planar side surface 16 and the curved corner radius 32, and a tangency point 38 delineates the transition between the substantially planar side surface 16 and the curved corner radius 34. Similarly, a corner radius 40, 42 extends from each end of the side surface 18. A tangency point 44 delineates the transition between the substantially planar side surface 18 and the curved corner radius 40, and a tangency point 46 delineates the transition between the substantially planar side surface 18 and the curved corner radius 42.

The side surface 20 includes a planar facet surface 48 extending radially inward from the corner radius 32, and a planar facet surface 50 extending radially inward from the planar facet surface 48 to a planar seating surface 52. Similarly, a planar facet surface 54 extends radially inward from the corner radius 40, and a planar facet surface 56 extends radially inward from the planar facet surface 54 to the planar seating surface 52.

It will be appreciated that the cutting insert 10 is mirror symmetric about the X-axis. Although not visible in FIGS. 1-5, it will be understood that the side surface 22 of the cutting insert 10 includes a planar facet surface extending radially inward from the corner radius 34, and a planar facet surface extending radially inward from the planar facet surface to a planar seating surface. Similarly, a planar facet surface extends radially inward from the corner radius 42, and a planar facet surface extends radially inward from the planar facet surface to the planar seating surface.

The cutting insert 10 includes a minor cutting edge 58 at the intersection between the planar facet surface 48 and the second surface 12, and a minor cutting edge 60 at the intersection between the planar facet surface 54 and the first surface 12. Because the cutting insert 10 is mirror symmetric about the X-axis, it will be understood that the cutting insert 10 includes two additional minor cutting edges 62, 64 at the intersections between the planar facet surfaces that extend from the corner radius 34, 42 and the first and second surfaces 12, 14, respectively. Thus, the double-sided cutting insert 10 includes a total of four minor cutting edges 58, 60, 62, 64.

One aspect of the invention is that the cutting insert 10 also includes a ramping cutting edge 66 at the intersection between the planar facet surface 50 and the second surface 14, and a ramping cutting edge 68 at the intersection between the planar facet surface 56 and the first surface 12. Because the cutting insert 10 is mirror symmetric about the X-axis, it will be understood that the cutting insert 10 includes two additional ramping cutting edges 70, 72 at the intersections between the planar facet surfaces extending from the corner radius 34, 42 and the first and second surfaces 12, 14, respectively. Thus, the double-sided cutting insert 10 includes a total of four ramping cutting edges 66, 68, 70, 72 that are radially inward with respect to the minor cutting edges 58, 60, 62, 64. The ramping cutting edges enables the cutting insert 10 of the invention to adequately perform two different types of cutting operations, namely ramping and milling cutting operations.

Figure 4:
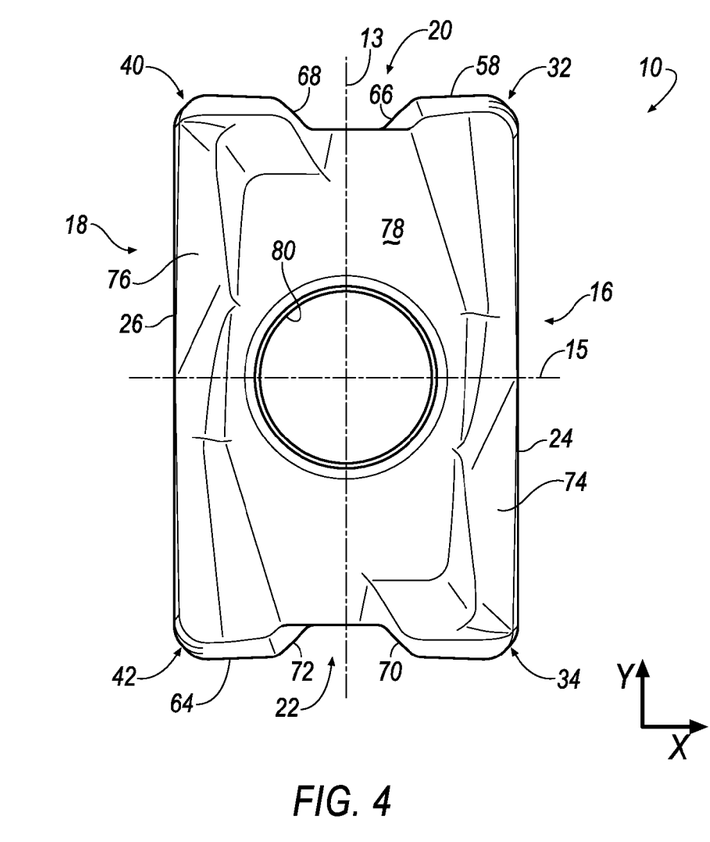
FIG. 4 is a front view of the cutting insert of FIG. 1 (the rear view being identical to the front view)

The first surface 12 includes a rake face 74 extending inwardly from the major cutting edge 24, a rake face 76 extending inwardly from the major cutting edge 26, and a planar seating surface 78 between the rake faces 74, 76. Because the cutting insert 10 is mirror symmetric about the X-axis, it will be understood that the second surface 14 of the cutting insert 10 includes two rake faces and a planar seating surface. A countersunk bore 80 extends entirely through the cutting insert 10 from the planar seating surface 78 on the first surface 12 to the planar seating surface on the second surface 14. The countersunk bore 80 is adapted to receive a fastener for mounting the cutting insert 10 to a cutting tool as is known in the art. It is noted that the countersunk bore 80 is centrally located in the planar seating surface 78 and the axis 11, which is parallel to the Z-axis, passes through the center of the countersunk bore 80, and the axes 13, 15 intersect the axis 11 at the center of the countersunk bore 80, as shown in FIG. 4. Thus, all three X, Y and Z-axes intersect at the center of the countersunk bore 80.

Figure 1:
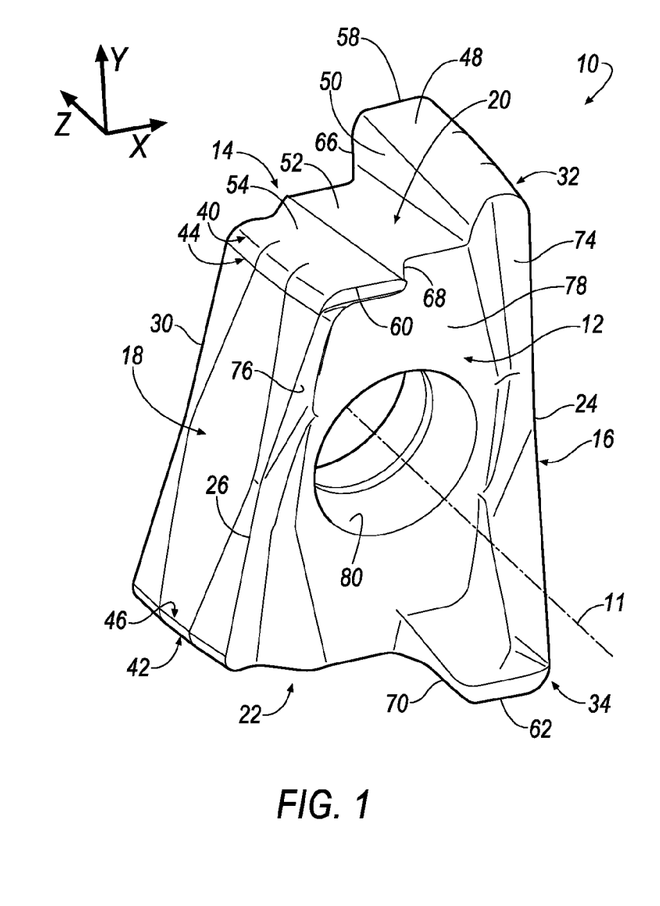
FIG. 1 is an isometric view of a cutting insert, such as a milling insert, according to an embodiment of the invention.
Figure 2:
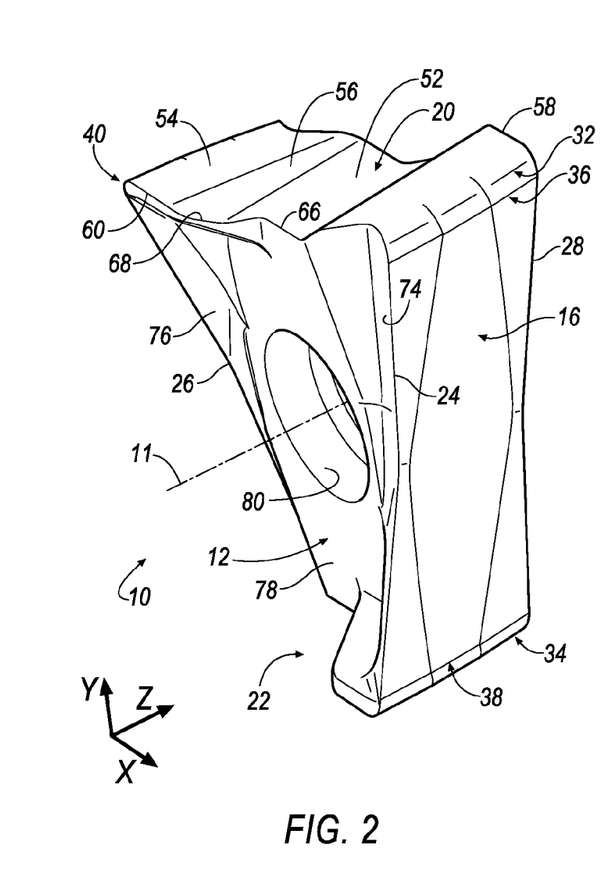
FIG. 2 is another isometric view of the cutting insert of FIG. 1 rotated about the Y-axis about 90 degrees.
Figure 3:
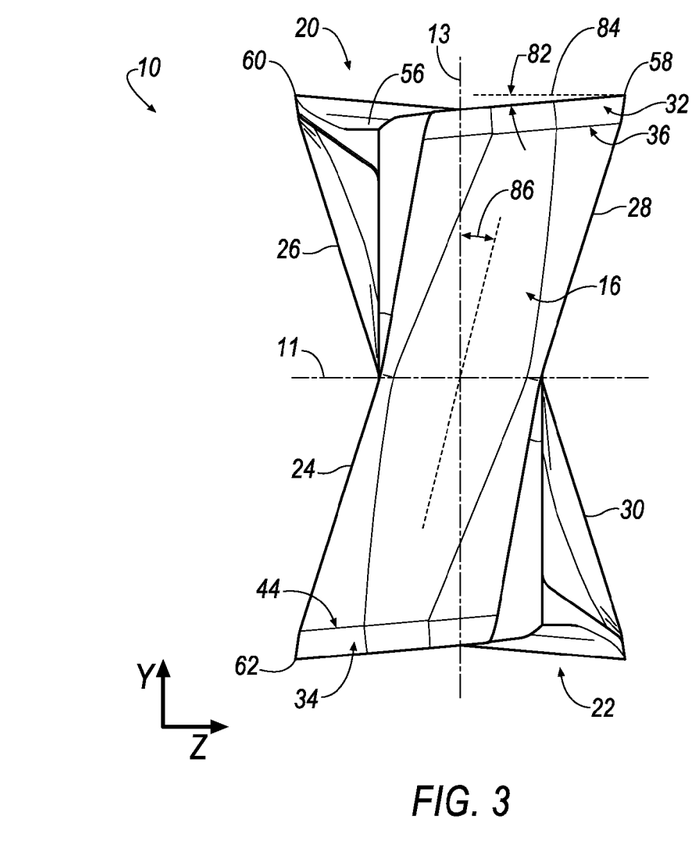
FIG. 3 is a side view of the cutting insert of FIG. 1.

Another aspect of the invention is that the minor cutting edges 58, 60, 62 and 64 of the cutting insert 10 are formed at a positive clearance angle 82 with respect to a plane 84 that is substantially parallel to the axis 11 (parallel to the Z-axis), as shown in FIG. 3. This aspect of the invention enables the cutting insert 10 when positioned in the milling cutter 100 at the angle 118 to have sufficient clearance 120 between the surface 48 and the work piece 130. In addition, the major cutting edges 24, 26, 28 and 30 are formed at a positive angle 86 with respect to the axis 13 (parallel to the Y-axis), as shown in FIG. 3.

Figure 5:
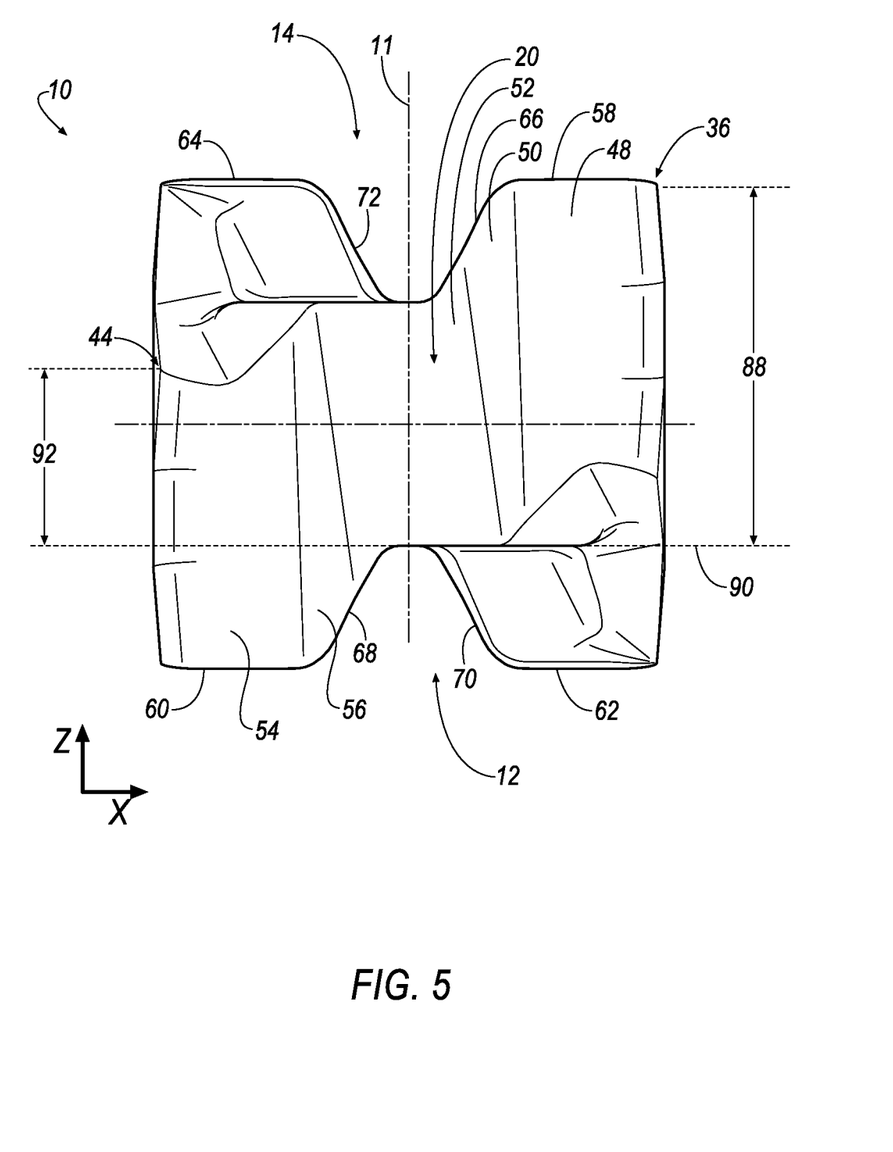
FIG. 5 is a top view of the cutting insert of FIG. 1.

Another aspect of the invention is that a distance 88 between a plane 90 defined by the seating surface 78 and the tangency point 36 is greater than a distance 92 between the plane 90 and the tangency point 44, as shown in FIG. 5. This aspect of the invention enables the cutting insert 10 when positioned in the cutter 100 at the angle 118 to have sufficient clearance 120 between the surface 54 and the work piece 130 when ramping using the cutting edge 66. Because the cutting insert 10 is mirror symmetric about the axis 15 (parallel to the X-axis), it will be appreciated that the distance between the plane defined by the seating surface of the second surface 14 and the tangency point delineating the corner radius 32 from the second surface 14 is greater than the distance between the plane and the tangency point delineating the corner radius 42 from the second surface 14.

Figure 6:
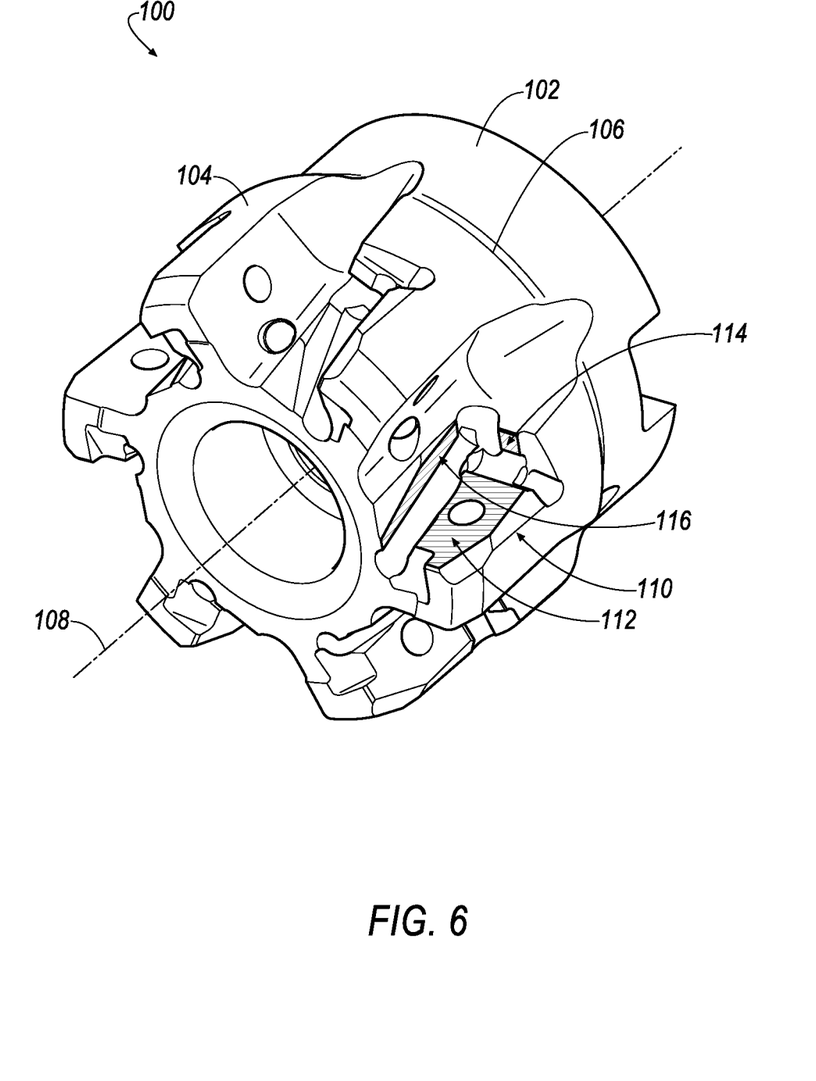
FIG. 6 is an isometric view of a milling cutter according to an embodiment of the invention with the cutting inserts not being mounted in the pockets for clarity.
Figure 7:
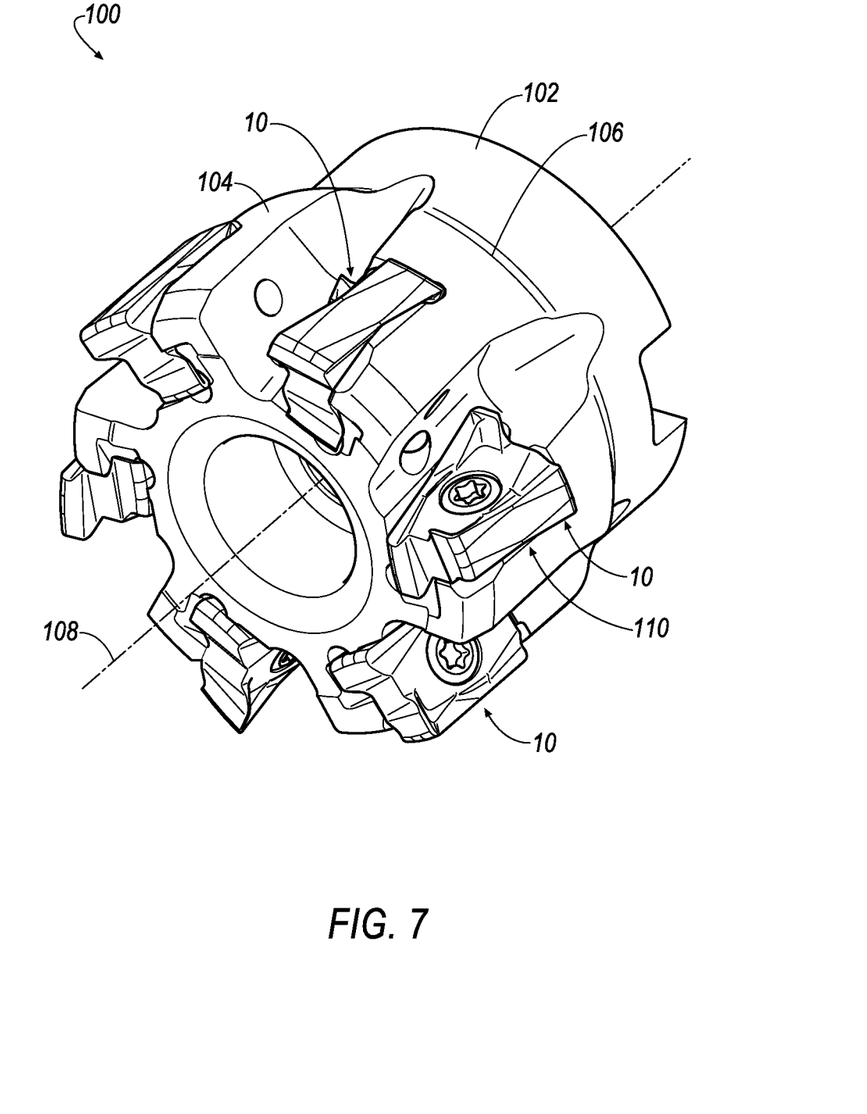
FIG. 7 is another isometric view of the milling cutter of FIG. 6 with the cutting inserts mounted in the pockets.

Referring now to FIGS. 6-9, there is shown a milling cutter 100 that is capable of receiving the cutting insert 10 of the invention. In general, the milling cutter 100 includes a shank 102, an upper portion 104 and a transition surface 106 between the shank 102 and the upper portion 104. The cutter 100 is preferably made from heat-treated steel, such as H13 tool steel, or other materials known to those skilled in the art. The specific material used will vary as a consequence of desired design characteristics of the cutter 100. The cutter 100 is rotated about a center axis 108. The cutter 100 also includes an insert pocket, shown generally at 110, formed at the leading end of the upper portion 104 of the cutter 100. As shown in FIG. 6, the insert pocket 110 includes a bottom seating surface 112, a radial seating surface 116 and an axial seating surface 114. Thus, the cutting insert 10 is mounted in the pocket 110 with three points of contact.

In the illustrated embodiment, the milling cutter 100 is capable of mounting five cutting inserts 10 within a respective insert pocket 110. However, it will be appreciated that the milling cutter 100 is not limited by the number of indexable cutting inserts 10 that can be mounted in the insert pockets 110, and that the invention can be practiced with any desired number of cutting inserts limited by only the physical limitations of the material properties of the milling cutter.

Figure 8:
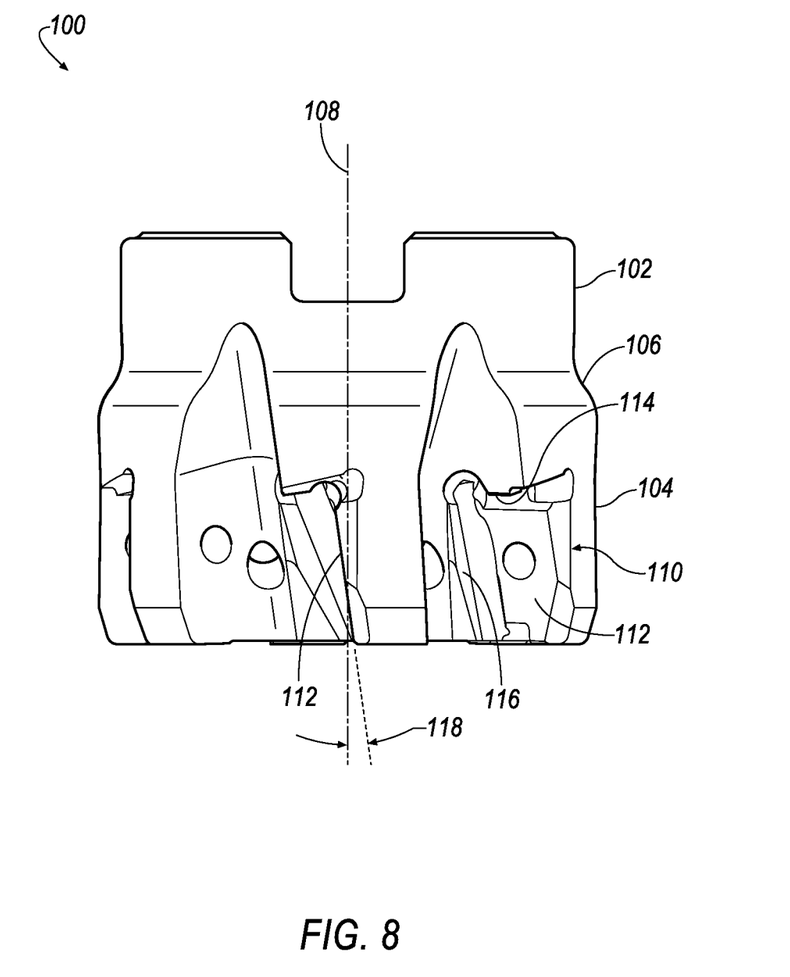
FIG. 8 is a side view of the milling cutter of FIG. 6 with the cutting inserts not being mounted in the pockets for clarity.

One aspect of the invention is that the bottom seating surface 112 of the pocket 110 is formed at a positive angle 118 with respect to the central, rotational axis 108 of the milling cutter 100, as shown in FIG. 8. The angle 118 is greater than 0 degrees and at most 10 degrees. It is noted that the angle 118 is less than the angle 86 between the major cutting edges 24, 26, 28 and 30 and the axis 13 (parallel to the Y-axis). The angle 118 of the bottom seating surface 112 causes the portion of the cutting insert 10 engaging the work piece 130 to tilt backwards (toward the central axis 108), thereby allowing the cutting insert 10 to perform ramping operations at a more aggressive angle as compared to conventional inserts.

Figure 9:
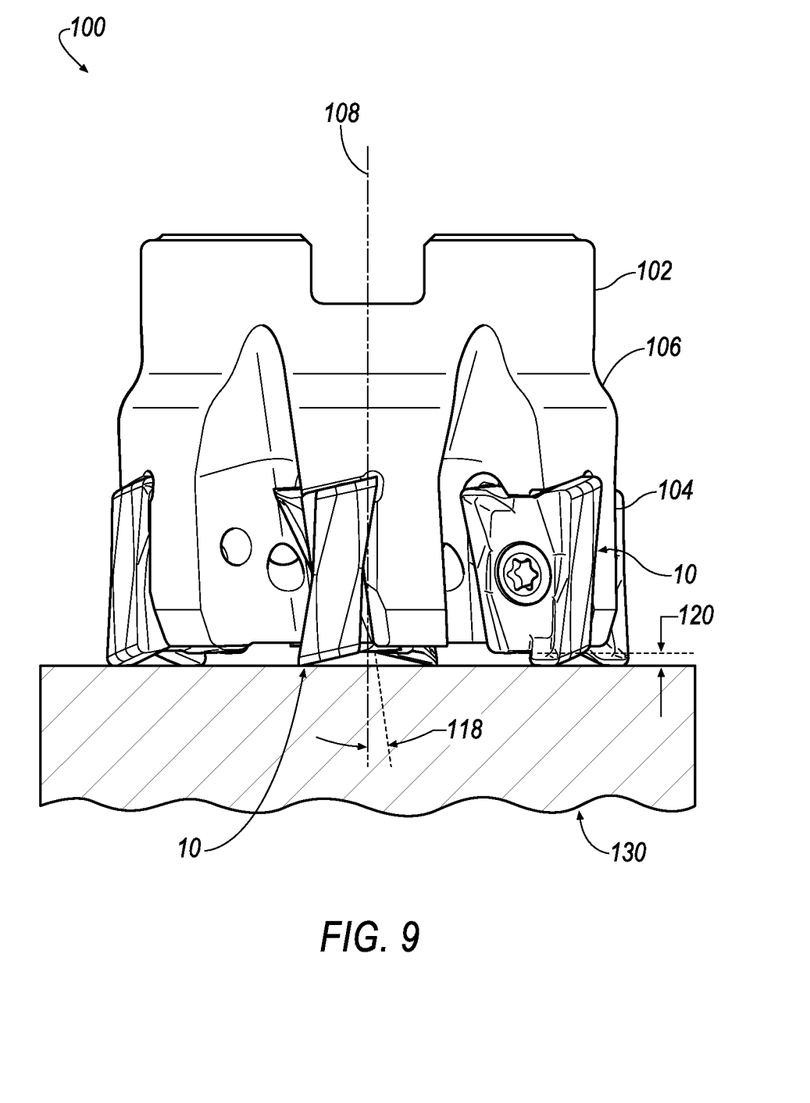
FIG. 9 is a side view of the milling cutter of FIG. 6 with the cutting inserts mounted in the pockets.

In addition, a clearance 120 is provided between the minor cutting edges 58, 60, 62 and 64 and the seating surface 52 of the cutting insert 10, as shown in FIG. 9. This clearance 120 also allows the cutting insert 10 to perform ramping operations at a more aggressive angle as compared to conventional inserts.

As described above, the cutting insert 10 of the invention has several aspects that enable the cutting insert 10 to perform both milling and ramping operations with superior performance as compared to conventional inserts. One aspect is that the cutting insert 10 includes multiple ramping cutting edges at the intersection between the planar facet surfaces and the first and second surfaces. Another aspect of the invention is that the minor cutting edges 58, 60, 62 and 64 of the cutting insert 10 are formed at a positive clearance angle 82 with respect to the plane 84 that is substantially parallel to the axis 11 (parallel to the Z-axis). Another aspect of the invention is that the distance 88 between the plane 90 defined by the seating surface 78 and the tangency point 36 is greater than the distance 92 between the plane 88 and the tangency point 44. Yet another aspect of the invention is that the bottom seating surface 112 of the pocket 110 is formed at a positive angle 118 with respect to the center axis 108 of the cutter 100. Still yet another aspect of the invention is that a clearance 120 is provided between the minor cutting edges 58, 60, 62 and 64 and the seating surface 52 of the cutting insert 10. Together, these aspects of the invention enables the cutting insert and milling cutter to provide superior cutting performance for both milling and ramping cutting operations.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A double-sided, indexable cutting insert for a milling cutter, comprising:
   a first surface, a second surface opposite the first surface, a countersunk bore extending entirely through from the first surface to the second surface, a first pair of opposing side surfaces and a second pair of opposing side surfaces, each of the second pair of opposing side surfaces including a first planar facet surface and a second planar facet surface, the second planar facet surface being radially inward with respect to the first planar facet surface, the first surface including a seating surface defining a plane;
   a major cutting edge defined at an intersection between each of the first and second surfaces and each of the first pair of opposing side surfaces for a total of four (4) major cutting edges;
   a corner radius connecting each of the first pair of opposing side surfaces to each of the second pair of opposing side surfaces, and a tangency point delineating the corner radius from the first pair of opposing side surfaces;
   a minor cutting edge defined at an intersection between each of the first and second surfaces and a first planar facet surface of each of the second pair of opposing side surfaces for a total of four (4) minor cutting edges; and
   a first ramping cutting edge defined at the intersection between the second surface and the first planar facet surface, and a second ramping cutting edge defined at the intersection between the first surface and the second planar facet surface for a total of four (4) ramping cutting edges,
   wherein the cutting insert is capable of performing both milling and ramping cutting operations.

2. The cutting insert of claim 1, wherein a distance between the plane of the seating surface and the tangency point of one of the opposing pair of side surfaces is greater than a distance between the plane of the seating surface and the tangency point of the other one of the opposing pair of side surfaces.

3. The cutting insert of claim 1, wherein the minor cutting edges are formed at a positive angle with respect to a plane that is parallel to a central, longitudinal axis of the cutting insert.

4. The cutting insert of claim 1, wherein the major cutting edges are formed at a positive angle with respect to a plane that is perpendicular to a central, longitudinal axis of the cutting insert.

5. The cutting insert of claim 1, further comprising a planar seating surface formed on the second pair of opposing side surfaces.

6. The cutting insert of claim 1, further comprising a rake face extending downwardly from the major cutting edge.

7. A milling cutter, comprising:
   a shank;
   an upper portion having an insert pocket, the insert pocket including a bottom seating surface, a radial seating surface and an axial seating surface;
   a cutting insert mounted in the insert pocket, the cutting insert including a first surface, a second surface opposite the first surface, a countersunk bore extending entirely through from the first surface to the second surface, a first pair of opposing side surfaces defining a planar seating surface, and a second pair of opposing side surfaces including a planar seating surface, each of the second pair of opposing side surfaces including a first planar facet surface and a second planar facet surface, the second planar facet surface being radially inward with respect to the first planar facet surface, the cutting insert further including a major cutting edge defined at an intersection between each of the first and second surfaces and each of the first pair of opposing side surfaces for a total of four (4) major cutting edges, a minor cutting edge defined at an intersection between each of the first and second surfaces and a first planar facet surface of each of the second pair of opposing side surfaces for a total of four (4) minor cutting edges; and a first ramping cutting edge defined at the intersection between the second surface and the first planar facet surface, and a second ramping cutting edge defined at the intersection between the first surface and the second planar facet surface for a total of four (4) ramping cutting edges, wherein the bottom seating surface of the insert pocket is formed at a positive angle with respect to a central, rotational axis of the milling cutter, thereby enabling the cutting insert to perform both milling and ramping cutting operations.

8. The milling cutter of claim 7, wherein the cutting insert further comprises a corner radius connecting the first pair of opposing side surfaces to the second pair of opposing side surfaces, and a tangency point delineating the corner radius from the first pair of opposing side surfaces.

9. The milling cutter of claim 8, wherein a distance between the plane of the seating surface and the tangency point of one of the opposing pair of side surfaces is greater than a distance between the plane of the seating surface and the tangency point of the other one of the opposing pair of side surfaces.

10. The milling cutter of claim 7, wherein the major cutting edges are formed at a positive angle with respect to a plane that is perpendicular to a central, longitudinal axis of the cutting insert, wherein the angle of the bottom seating surface is less than the angle between the major cutting edges and the axis.

11. The milling cutter of claim 7, the minor cutting edges are formed at a positive angle with respect to a plane that is parallel to a central, longitudinal axis of the cutting insert.

* * * * *